(12) United States Patent
de Block et al.

(10) Patent No.: US 10,384,219 B2
(45) Date of Patent: Aug. 20, 2019

(54) LOW PRESSURE 2-K HANDHELD SPRAY GUN

(71) Applicant: STRONGBOND B.V., Dinxperlo (NL)

(72) Inventors: Rudolph Frank de Block, Steenenkamer (NL); Antonius Wilhelmus Zaarbelink, Gaanderen (NL)

(73) Assignee: STRONGBOND B.V., Dinxperlo (NL)

( * ) Notice: Subject to any disclaimer, the term of this patent is extended or adjusted under 35 U.S.C. 154(b) by 85 days.

(21) Appl. No.: 15/261,524

(22) Filed: Sep. 9, 2016

(65) Prior Publication Data

US 2016/0375450 A1 Dec. 29, 2016

Related U.S. Application Data

(63) Continuation of application No. PCT/NL2015/050155, filed on Mar. 12, 2015.

(30) Foreign Application Priority Data

Mar. 12, 2014 (NL) ...................................... 2012409

(51) Int. Cl.
*B05B 7/08* (2006.01)
*B05B 9/01* (2006.01)
(Continued)

(52) U.S. Cl.
CPC .............. *B05B 7/0846* (2013.01); *B05B 7/04* (2013.01); *B05B 7/0815* (2013.01); *B05B 7/12* (2013.01); *B05B 7/1209* (2013.01); *B05B 9/01* (2013.01); *B05B 12/002* (2013.01); *C09J 107/00* (2013.01); *C09J 109/06* (2013.01); *C09J 111/00* (2013.01); *C09J 123/0853* (2013.01); *C09J 125/10* (2013.01); *C09J 131/04* (2013.01);
(Continued)

(58) Field of Classification Search
CPC ........... B05B 9/01; B05B 7/0815; B05B 7/04; B05B 7/0846; B05B 12/002; B05B 7/12; B05B 7/1209; C09J 107/00; C09J 109/06; C09J 111/00; C09J 123/0853; C09J 125/10; C09J 131/04; C09J 133/08; C09J 175/04
USPC ....... 239/290, 296, 413, 414, 422, 428, 525, 239/526, 527
See application file for complete search history.

(56) References Cited

U.S. PATENT DOCUMENTS 2,969,926 A 1/1961 Peeps
4,074,857 A 2/1978 Calder
(Continued)

FOREIGN PATENT DOCUMENTS

DE 3336053 4/1985
JP 2002036259 2/2002
(Continued)

*Primary Examiner* — Steven J Ganey
(74) *Attorney, Agent, or Firm* — Peacock Law P.C.; Janeen Vilven; Justin R. Muehlmeyer

(57) ABSTRACT

A low pressure limited overspray handheld aerosol spray gun for spraying a two-component adhesive, a method for spraying a two-component adhesive and a two-component adhesive obtainable by that method. In manufacturing of larger objects, such as matrasses and furniture, adhesives are often applied to fix parts of the large object together. Most adhesives are applied using either air-spray equipment or air-assisted spray equipment.

10 Claims, 2 Drawing Sheets

(51) Int. Cl.
*B05B 7/12* (2006.01)
*B05B 7/04* (2006.01)
*B05B 12/00* (2018.01)
*C09J 107/00* (2006.01)
*C09J 109/06* (2006.01)
*C09J 111/00* (2006.01)
*C09J 123/08* (2006.01)
*C09J 125/10* (2006.01)
*C09J 131/04* (2006.01)
*C09J 133/08* (2006.01)
*C09J 175/04* (2006.01)
*B05B 7/24* (2006.01)

(52) U.S. Cl.
CPC ........... *C09J 133/08* (2013.01); *C09J 175/04* (2013.01); *B05B 7/2497* (2013.01)

(56) References Cited

U.S. PATENT DOCUMENTS

| | | |
|---|---|---|
| 4,685,621 A | 8/1987 | Scherer et al. |
| 4,824,017 A | 4/1989 | Mansfield |
| 4,928,884 A | 5/1990 | Smith |
| 5,419,491 A * | 5/1995 | Breitsprecher ....... B05B 7/0815 239/294 |
| 6,824,071 B1 * | 11/2004 | McMichael ........... B05B 7/0815 239/8 |

FOREIGN PATENT DOCUMENTS

| | | |
|---|---|---|
| JP | 2013-052385 | 3/2013 |
| WO | 95/13878 | 5/1995 |
| WO | 2015/137808 | 9/2015 |

\* cited by examiner

LOW PRESSURE 2-K HANDHELD SPRAY GUN

CROSS-REFERENCE TO RELATED APPLICATIONS

This application is a continuation application of Patent Cooperation Treaty Application No. PCT/NL2015/050155, filed on Mar. 12, 2015, which claims priority to Netherlands Patent Application No. 2012409, filed on Mar. 12, 2014, and the specifications and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field)

The present invention relates to a low pressure limited overspray handheld aerosol spray gun for spraying a two-component adhesive, a method for spraying a two-component adhesive and a two-component adhesive obtainable by the method.

Description of Related Art Including Information Disclosed Under 37 C.F.R. §§ 1.97 and 1.98

In manufacturing of larger objects, such as matrasses and furniture, adhesives are often applied to fix parts of the large object together. Most adhesives are applied using either air-spray equipment or air-assisted spray equipment.

Airless spraying involves using pressure to force a fluid to be sprayed through a small orifice. Airless spray equipment is often operated at higher pressures than air-spray- or air assisted-spray equipment. Operating pressures of airless spray systems are typically up to 50,000 kPa (~500 bar). Air-spray uses pressurized air to spray adhesives. Operating pressures are typically up to 1600 kPa (~16 bar). In view of operating pressure, and in view of adhesives used, air-spray and airless spray methods are at least difficult to combine. Methods and products for applying a layer of adhesive onto a surface wherein the method comprises spraying the adhesive airlessly are known in the prior art. Likewise air pressurized products and methods are known.

Prior art methods and spray guns, and especially air-assisted spray equipment, suffer from a phenomenon called over-spray. It is noted that spraying inherently relates to having an adhesive to be air borne. Under ideal circumstances, using, e.g., a dedicated and sophisticated fully automated equipment, which may have one spray gun or a series of parallel spray guns, at a fixed distance from a surface to be sprayed an amount of overspray may be limited to less than about 10% of a total amount of adhesive applied. As the sprayed material relates to an adhesive an end result is that eventually all items close by and typically a surrounding environment is covered with a layer of adhesive. More serious is that in view of labor conditions employees are exposed to air-borne adhesives. Of course the overspray is also a waste of materials per se.

A measure that could reduce an amount of adhesive in the air is to actively remove air borne adhesive by suction/ventilation. Apart from the energy and equipment costs such may also involves heating/cooling fresh air being supplied. Furthermore, it also determines a selection of a physical location of spraying to a location where active ventilation is provided; typically spraying cannot be performed at any given location, e.g. where a surface to be sprayed is located. In other words, such is unwanted.

It is noted when the spray gun is handheld the situation is much worse, especially in terms of amount of overspray. Under ideal circumstances, e.g., a fixed distance between the spray gun and object to be sprayed, a fixed pressure, etc. less than 20% overspray (in relation to a total amount applied) is obtainable. In practice more than 30% of the amount applied is over sprayed, and typically more than 40%.

Another issue with airless systems is a phenomenon called tailoring. At the edge of a spraying pattern a relatively larger amount of adhesive is deposited. If the adhesive is colored, which is typically the case, such can be observed as a thicker or more intense colored line. A distribution of adhesive is not even over the surface, e.g., in terms of amount of adhesive per unit surface, which is unwanted.

In case of an air-spray system the adhesive is not homogeneously distributed over a surface to which the spray is applied. Typically there is much more adhesive at the center of the surface compared to the edges thereof. Also a lot of overspray, beyond the edges, is present.

For two-component adhesives good mixing of the two components may be an issue as well. Mixing does not only relate to intimately combining the two components, but also to securing a required ratio of components in the mixed adhesive. Typically one component is provided in a relatively large amount and the other in a relatively small amount. Such is even more complex if a relatively large area needs to be covered with an adhesive.

Other disadvantages for pressurized air systems are as follows. It is noted that pressurized air itself also contributes considerably to costs of applying adhesive, especially if more complex equipment is needed. Also, prior art methods typically make use of rather complicated equipment, especially air assisted spray equipment. Such systems are rather voluminous, complex and costly.

As an amount of adhesive to be applied at a given moment in prior art systems is typically much smaller than a content of a container there is a risk that the component may clog, block a tube, etc. Such requires cleaning of the equipment.

The prior art equipment is typically (somewhat) difficult to handle, e.g., in terms of relocating, and replacing feed stock. Also, in view of complexity, such systems are at a certain distance from a location where the adhesive is being applied; inherently such involves some further risks, e.g., clogging of tubing, less control at the location of application, etc.

In an example DE 33 360 53 A recites a 2-component spray gun with two spray heads, in which the main component is atomized by the airless spray method and the hardener component is atomized by the compressed-air spray method. A high pressure is used to spray the two components. As a result, airborne particles are formed which spread throughout a given location of application and a spray pattern is not well controlled.

U.S. Pat. No. 4,928,884 A recites a fluid assist airless spray nozzle for spraying a plural component spray system with a nozzle plate having an airless discharge orifice located therein for spraying a first component of the plural component system as, for instance, a resin component. A first fluid discharge orifice is located on one side of the airless discharge orifice and a second fluid discharge orifice is located on the other. Outboard of the first fluid discharge orifice is a first gas discharge orifice and outboard of the second fluid discharge orifice is a second gas discharge orifice. The system is considered rather complicated, having various of the above risks, such as airborne particles, and typically not providing an adequate spray pattern.

In view of the disadvantages of the prior art systems there is a need for an improved low pressure 2-K handheld spray gun which overcomes one or more of the above disadvantages, without jeopardizing functionality and advantages.

BRIEF SUMMARY OF THE INVENTION

The present invention relates to an improved low pressure 2-K handheld spray gun according to claim 1.

Therein an adhesive is provided in amount of 80-97 wt. % of a first fluid and 3-20 wt. % of a second fluid, the wt. percentage calculated on a combined first and second fluid. The first fluid and second fluid are provided through separate fluid passage ways and mixed when airborne. The first and second fluids are typically present in an external container or the like. Typically an external container is on connection with the spray gun by means of a tubing or the like, which tubing is connected to the spray gun by means of a connector, such as a plug, a screw, etc.

The first and second fluids are sprayed through a nozzle, which nozzle is preferably removable. For instance in view of an adhesive provided, and amount of adhesive provided, a ratio of first and second fluid provided, a spray pattern to be provided, etc. a nozzle may be replaced in order to be in line with requirements.

The first and second fluid passage ways are controlled by a mechanism for opening and closing of the passage way of each fluid to the nozzle. A trigger is provided for simultaneous control of the mechanisms; as such a person holding the spray gun can control application of the adhesive (components) by using the trigger for opening and closing.

It has been found that using airless pressure cannot solve all of the above problems. Especially mixing of components and spray pattern are difficult to control. Surprisingly if only the second component is sprayed using a reduced air pressure, in combination with an airless spraying of the first component, full control is achieved. Thereto a third fluid passage way for providing air is provided. Also a chamber wherein the second and third passage ways enter and from which access to the second nozzle is provided. The chamber preferably has a cross section which is 0.9-10 times a cross section of the second (or third) passage way.

In order to further optimize a spray pattern a first removable nozzle tip attached to the first nozzle is provided, which first nozzle tip has a slit incorporated therein.

Thereby the present invention provides a solution to one or more of the above mentioned problems, and in particular an amount of airborne adhesive not being applied to a surface is virtually absent.

Advantages of the present description are detailed throughout the description.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
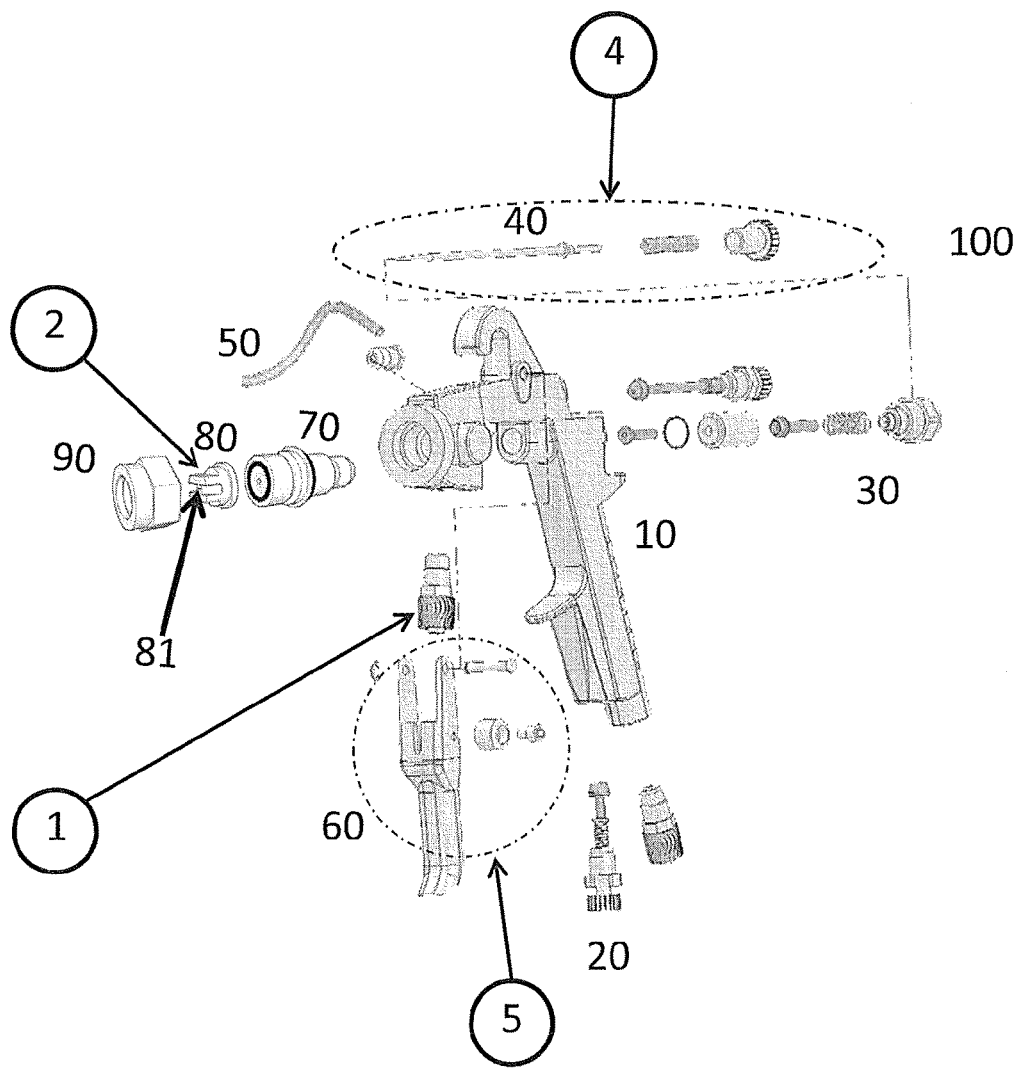
FIG. 1 relates to a spray gun according to the invention.

The present invention relates in a first aspect to a handheld spray gun according to claim 1.

In an example of the present handheld spray gun the second nozzle is directed such that the second fluid intimately mixes with the first fluid at a distance of 1-10 cm of the first nozzle, preferably 2-7 cm. Is has been found that in order to reduce overspray and have a good mixing the first and second fluid mix at a certain distance from the top. Depending on a pressure applied, and to a ratio of the pressures, as well as on the nozzles provided, a distance may vary somewhat. The distance is preferably not too large, as mixing is than not optimal and overspray increases. A similar argument holds for a too small distance.

In an example of the present handheld spray gun the first nozzle has an opening with a first area, preferably a circular opening, wherein the second nozzle has an opening with a second area, preferably a circular opening, wherein a ratio between the first area and the second area is between 0.2 and 5, preferably between 0.33 and 3.5, more preferably between 0.45 and 2.5, such as between 0.66 and 1.5. It has been found that the openings are relatively small, such as 0.28-0.8 mm for the first nozzle, and 0.35-1.0 mm for the second nozzle. The openings preferably have an annular form. It has also been found that the ratio of surface areas of the openings of the two nozzles is within the above mentioned ranges, despite the first fluid being provided in much larger quantities, compared to the second fluid.

In an example of the present handheld spray gun is capable of withstanding a first fluid pressure of 200-800 kPa (2-8 Bar), preferably at 250-400 kPa, more preferably at 275-350 kPa. In other words, compared to other airless systems, the first fluid is provided at a relatively low pressure. It has been found that, in combination with the nozzle and nozzle tip, such a pressure provides a very good spray pattern, e.g., in terms of quantity provided per unit surface area, in terms of overspray, in terms of mixing, in terms of tailoring, in terms of amount of airborne particles, etc. The pressure used is also relatively safe for employees using the present spray gun.

In an example of the present handheld spray gun is capable of withstanding a second fluid pressure of 10-100 kPa (0.1-1.0 Bar), preferably at 12-40 kPa, more preferably at 20-30 kPa. Despite the pressure being provided with air, the pressures used are surprisingly low and can be provided with e.g. a simple ring tubing for pressurized air, a container having pressurized air, etc. The amount of air used is estimated to be about 1-10% com-pared to prior art air spray guns. It is noted that the second fluid itself is pressurized as well, comparable to the first fluid, but at a lower pressure, typically at a pressure of 15-100 kPa (0.15-1.0 Bar), preferably at 20-50 kPa, more preferably at 25-35 kPa.

It is noted that with the present adaptable nozzles a spray pattern can be adjusted easily, such as by adjusting a pressure. Also a mixing ratio between first and second fluid can be adjusted easily.

In a second aspect the present invention relates to a system for spraying a two-component adhesive comprising an aerosol spray gun according to any of the preceding, comprising:

(A) a means for providing an airless pressure of 200-800 kPa to the first fluid, and (B) a means for providing an air pressure of 10-100 kPa to the second fluid.

In a third aspect the present invention relates to a method of spraying a two component adhesive comprising a first and second fluid. The method comprises the steps of providing an aerosol spray gun according to any of claims 1-5 or a system according to claim 6.

The first fluid relates to a first component of a two component adhesive. It is preferably selected from a polychloroprene dispersion, polyurethane dispersion, polyacrylate dispersion, vinylacetate-ethylene dispersion, ethylene-vinylacetate dispersion, natural rubber dispersion, styrene-butadiene-styrene copolymer dispersion, styrene-butadiene rubber dispersion, and combinations thereof. The first component is preferably provided at a pressure of 200-800 kPa (2-6 Bar), preferably at 250-400 kPa, more preferably at 275-350 kPa.

The second fluid relates to a second component of a two component adhesive. The second fluid is preferably an activator. It is preferably selected from a salt of a multivalent metal such as zinc, aluminum or calcium; or an acid solution, such as selected from citric acid, formic acid, acetic acid, lactic acid and mineral acid having a pH below 5, preferably below 4.5, most preferably below 4, and combinations thereof. The second component is preferably provided at a pressure of 150-500 kPa (0.15-0.5 Bar), preferably at 200-400 kPa, more preferably at 250-300 kPa.

A next step relates to applying the combined fluids as an adhesive to a surface.

In an example of the present method the viscosities of the first- and second-fluids are in the range of 0.2 mPa*s to 10 Pa*s at 25° C. It has been found that for intimate mixing, obtaining a good spray pattern, reducing overspray, etc., these viscosities suit particularly well.

In an example of the present method a pressure for spraying is provided by one or more selected from: positive dis-placement pumps, such as double diaphragm pumps or piston pumps; pressurized systems such as pressure tanks; and, gravity feed feeding systems.

In an example the present method is for applying >90 wt. % of adhesive as provided to a surface, preferably >95 wt. %, such as >98 wt. %. An amount of overspray (loss) and an amount of adhesive applied (yield) is measured according to DIN 13966 (September 2003), specifically part 1 thereof. If boundary conditions are optimized almost 100.0 wt. % is provided to an intended surface. As such the present method reduces overspray and provides further advantages, as mentioned.

An amount of overspray (loss) and an amount of adhesive applied (yield) is measured according to DIN 13966, specifically part 1 thereof.

In a fourth aspect the present invention relates to a use of the present spray gun or system for one or more of limiting use of air by more than 50%, limiting overspray to less than 10 wt. %, improving mixing of first and second fluid to more than 90%, improving homogeneity of a sprayed layer to more than 90%, enlarging a width of a spray pattern by more than 20%, limiting an amount of adhesive per unit sprayed area to less than 80%, and limiting tailing to less than 10%.

In a fifth aspect the present invention relates to an adhesive layer, such as obtainable by a method according to the invention, amongst others having an improved homogeneity to more than 90%.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

The reference numerals used in the figures are:
10 Main Body of spray gun
20 Air input regulator
30 Opening and closing mechanism
40 Material needle
70 Nipple
80 Airless nozzle
81 Slit
90 Swivel
95 Spray gun add on
1 first and second connection
2 first nozzle and second nozzle
3 separate fluid passage ways
4 first and second mechanism for opening and closing
5 trigger for simultaneous control of the mechanisms
6 third fluid passage way
7 chamber FIG. 1 relates to a spray gun 100. Therein various elements of an example of the present spray gun can be seen. For instance an input regulator for air 20 is shown. Also a handle 60 for opening and closing is provided. Part 10 relates to a main body. Further an opening and closing mechanism 30 for air and a material needle 40 for adhesive is shown. Also an air hose to activator switch 50 is shown. Further, the elements 1-7 (found in claim 1) have been identified in the figure.

Figures 2A, 2B, 2C:
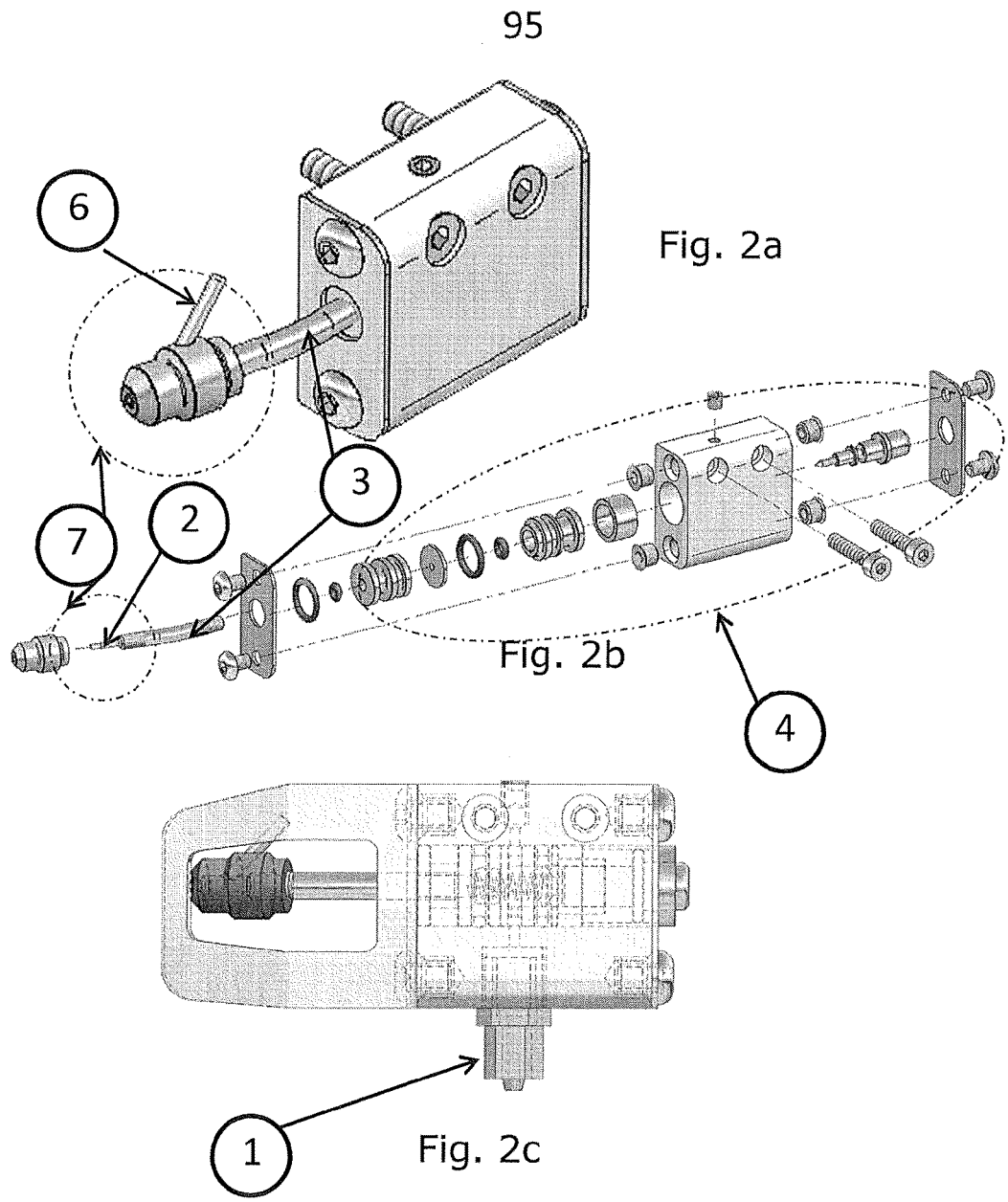
FIGS. 2a-c relate to a spray gun add on according to the invention.

FIGS. 2*a-c* relate to a spray gun add on 95. The add-on is for providing air pressure to a second component of the adhesive to be applied. FIG. 2*a* shows the assembled activator switch, whereas FIG. 2*b* shows construction of the switch.

FIG. 2*c* shows a worked open version of the add on 95. Further, the elements 1-7 (found in claim 1) have been identified in the figure.

It should be appreciated that for commercial application it may be preferable to use one or more variations of the present system, which would similar be to the ones disclosed in the present application and are within the spirit of the invention.

What is claimed is:

1. A low pressure limited overspray handheld aerosol spray gun for spraying a two-component adhesive comprising 80-97 wt. % of a first fluid and 3-20 wt. % of a second fluid, the wt. percentage calculated on a combined first and second fluid, comprising:
   (a) a first and second connection for supply of the first and second fluid, respectively,
   (b) one first nozzle and one second nozzle, wherein the first nozzle has an opening with a first area, wherein the second nozzle has an opening with a second area, wherein a ratio between the first area and the second area is between 0.2 and 5,
   (c) a separate fluid passageway for the first and second fluid between the connection and nozzle, respectively,
   (d) a first and second mechanism for opening and closing of the passage way of each fluid to the nozzle,
   (e) a trigger for simultaneous control of the mechanisms, a third fluid passageway for providing air,
   (g) a chamber wherein the second and third passage ways enter and from which access to the second nozzle is provided, and
   (h) a first removable nozzle tip attached to the first nozzle, and
   wherein the first nozzle tip has a slit incorporated therein, and
   wherein the system is capable of withstanding a first fluid airless pressure of 200-800 kPa (2-8 Bar) and capable of withstanding a second fluid air-assisted pressure of 12-100 kPa (0.12-1.0 Bar).

2. The aerosol spray gun according to claim 1, wherein the second nozzle is directed such that the second fluid intimately mixes with the first fluid at a distance of 1-10 cm of the first nozzle.

3. The aerosol spray gun according to claim 1, wherein the ratio between the first area and the second area is between 0.33 and 3.5.

4. A system for spraying a two-component adhesive comprising an aerosol spray gun according to claim 1, comprising:
   (A) a pump for providing an airless pressure of 200-800 kPa to the first fluid, and
   (B) a pump for providing an air pressure of 10-100 kPa to the second fluid.

5. A method of spraying a two component adhesive comprising a first and second fluid comprising the steps of:
   providing an aerosol spray gun according to claim 1,
   providing the first fluid selected from the group consisting of polychloroprene dispersion, polyurethane dispersion, polyacrylate dispersion, vinylacetate-ethylene dispersion, ethylene-vinylacetate dispersion, natural rubber dispersion, styrene-butadiene-styrene copolymer dispersion, styrene-butadiene rubber dispersion, and combinations thereof, at an airless pressure of 200-800 kPa (2-8 Bar),
   providing the second fluid which comprises an activator at an air assisted pressure of 15-50 kPa (0.15-0.5 Bar), and
   applying the combined fluids as the adhesive to a surface.

6. The method according to claim 5, wherein the viscosities of the first- and second-fluids are in the range of 0.2 mPa*s to 10 Pa*s at 25° C.

7. The method according to claim 5, wherein pressure for spraying is provided by one or more selected from the group consisting of positive displacement pumps, pressurized systems, and gravity feed feeding systems.

8. The method according to claim 5, applying >90 wt. % of adhesive as provided to a surface.

9. An adhesive layer obtained by a method according to claim 5, the adhesive layer comprising:
   the first fluid selected from the group consisting of polychloroprene dispersion, polyurethane dispersion, polyacrylate dispersion, vinylacetate-ethylene dispersion, ethylene-vinylacetate dispersion, natural rubber dispersion, styrene-butadiene-styrene copolymer dispersion, styrene-butadiene rubber dispersion, and combinations thereof, and
   the second fluid comprising activator, and
   having a >95% reduced overspray and an improved homogeneity of more than 90%.

10. The use of an aerosol spray gun according to claim 1 in applying an adhesive layer, the adhesive layer comprising:
   the first fluid selected from the group consisting of polychloroprene dispersion, polyurethane dispersion, polyacrylate dispersion, vinylacetate-ethylene dispersion, ethylene-vinylacetate dispersion, natural rubber dispersion, styrene-butadiene-styrene copolymer dispersion, styrene-butadiene rubber dispersion, and combinations thereof, and
   the second fluid comprising an activator, and
   wherein upon application one or more is provided of limiting use of air by more than 50%, limiting overspray to less than 10 wt. %, improving mixing of first and second fluid to more than 90%, improving homogeneity of a sprayed layer to more than 90%, enlarging a width of a spray pattern by more than 20%, limiting an amount of adhesive per unit sprayed area to less than 80%, and limiting tailing to less than 10%.

* * * * *